Sept. 13, 1949.　　　C. S. BOHMER ET AL　　　2,481,642
MULTIPLE TOOL HEAD
Filed July 8, 1944　　　　　　　　　　　　2 Sheets-Sheet 1
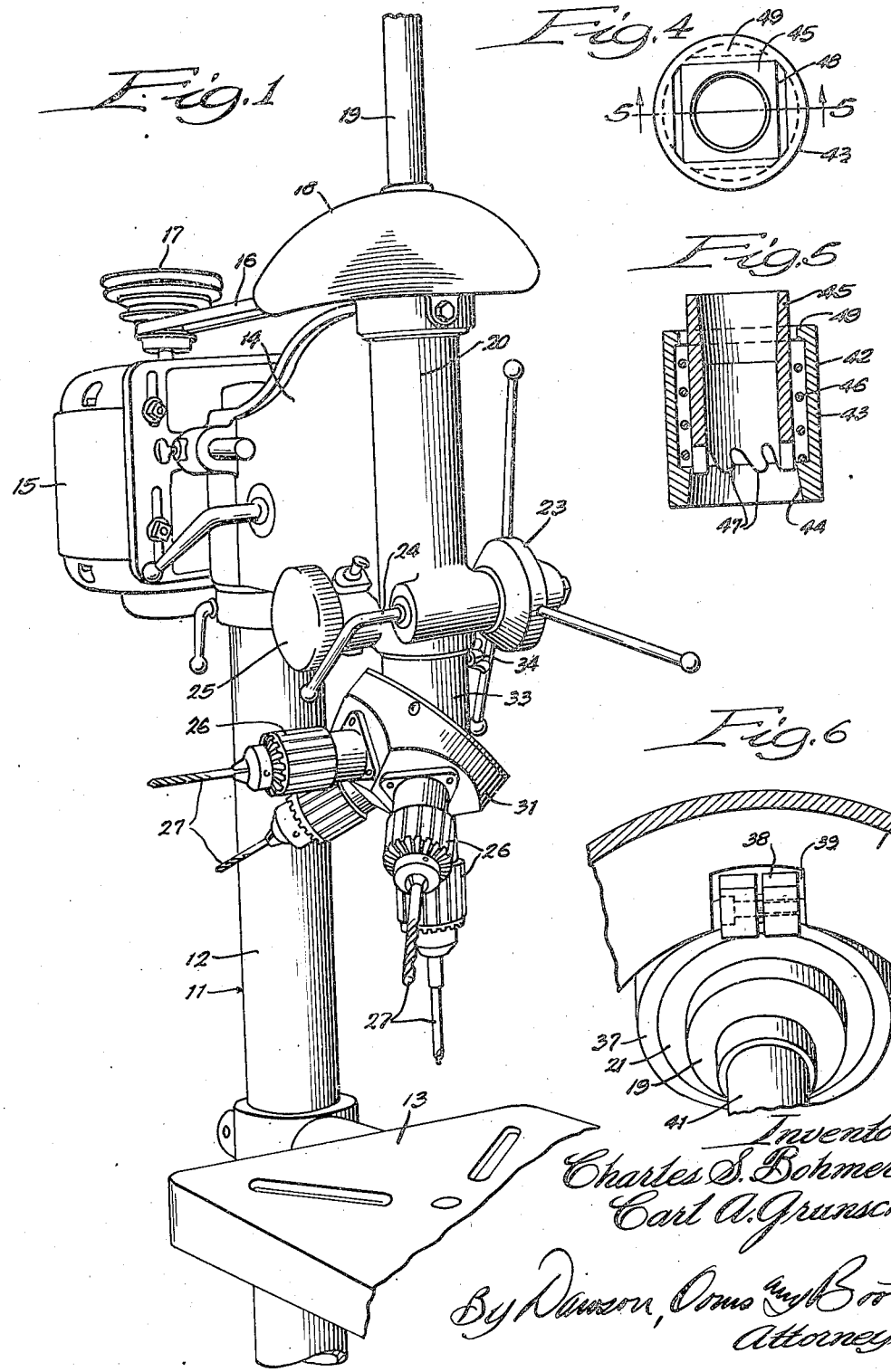

Sept. 13, 1949.   C. S. BOHMER ET AL   2,481,642
MULTIPLE TOOL HEAD
Filed July 8, 1944   2 Sheets-Sheet 2
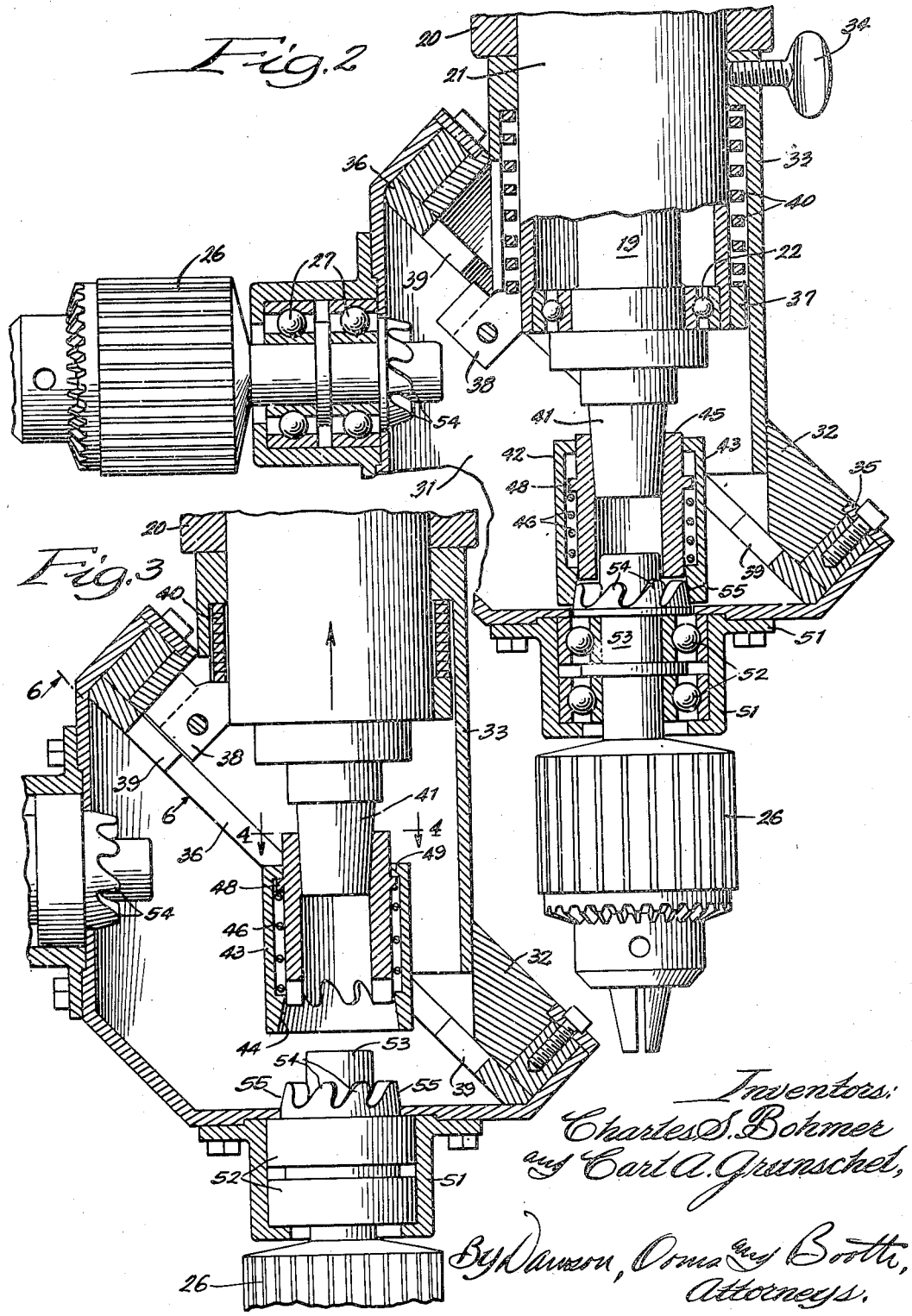

Patented Sept. 13, 1949

2,481,642

UNITED STATES PATENT OFFICE 2,481,642

MULTIPLE TOOL HEAD

Charles S. Bohmer, Chicago, and Carl A. Grunschel, Park Ridge, Ill.

Application July 8, 1944, Serial No. 544,012

2 Claims. (Cl. 77—25)

This invention relates to a multiple tool head for use on drill presses and similar machines to permit the use of a single driving spindle with a plurality of tools and to permit the tools to be used selectively and to be brought into operating position conveniently and without the use of any special tools or instruments.

A further object of the invention is to provide a multiple tool head in which the selected tool cannot be moved out of operating position without disengagement of the driving mechanism.

Another object of the invention is to provide a positive lock to retain the selected tool in driving position until there is complete disengagement of the driving spindle and the driven member.

Another object of the invention is to prevent the driving spindle from being brought down into driving position until the tool head is registered into correct position for driving engagement.

A further object of the invention is to provide a novel frictional drive which will begin to rotate the driven member before there is positive engagement of the driving dog with the teeth of the dog on the driven member.

Still another object of the invention is to provide a multiple tool head which can be easily fitted upon a standard drill press and operated by means of the conventional equipment found thereon.

A further object of the invention is to provide a driver head for the driving spindle which can be quickly and easily assembled and disassembled without the use of special tools.

These and other features of the invention will be seen from the following detailed specification read in connection with the accompanying drawings forming part thereof and in which—

Fig. 1 is a perspective view of a head of a conventional drill press equipped with the multiple tool head of this invention;

Fig. 2 is a section of the multiple tool head of this invention with the driving spindle shown in driving engagement;

Fig. 3 is a fragmentary section of the head showing the spindle driver head raised to disengage the spindle from driving engagement and to unlock the multiple tool head for rotation;

Fig. 4 is a top plan view of the driver head taken on the line 4—4 of Fig. 3;

Fig. 5 is a vertical section of the driver head taken on the line 5—5 of Fig. 4;

Fig. 6 is a fragmentary section taken on the line 6—6 of Fig. 3 to show the locking lug in registration with a notch in the locking plate.

Referring to the drawings, the multiple tool head of this invention is shown fitted to a conventional drill press 11 which comprises a suitable base and a vertical column 12 to which is secured the work table 13. Adjustably mounted near the top of the column 12 are the head casting 14 and the driving motor 15. The driving motor is engaged by means of the driving pulleys 17 and the belt 16 with a spindle drive beneath the spindle drive hood 18. The vertically movable spindle 19 is mounted for rotation within the spindle head 20.

The spindle 19 is mounted in a vertically movable quill 21 upon suitable spindle bearings of which one set, 22, is shown. The quill 21 with the rotatable spindle 19 mounted therein is moved vertically by means of the spindle feed wheel 23 which can be locked in stationary position by means of the latch 24. The quill can also be placed under tension by means of the tension knob 25 so that when the feed wheel 23 is released the quill is moved upwardly into inoperative position.

The multiple head is provided with a plurality of conventional chucks 26 each of which can adjustably retain a suitable tool 27 such as a drill bit, countersink, reamer, etc.

This multiple tool head is shown comprising the housing 31 which is fitted with a housing cover 32. This cover is formed integrally with the quill sleeve 33 which slides over the quill 21 and is held against displacement during assembly by means of the sleeve set screws 34.

The housing cover 32 is secured to the housing 31 by means of the housing ring 35 which can be bolted to the housing by means of suitable bolts or screws. This ring permits the housing 31 to be rotated about the housing cover 32.

Within the housing and beneath the housing cover is the indexing plate 36 which is notched with a plurality of notches 39 each of which is in registry with one of the driven tool heads and chucks 26.

The indexing plate is either made integrally with the housing 31 or secured immovably thereto so that the position of the housing with its attached chuck mountings is at all times determined by the location of the indexing plate.

While in the preferred embodiment the multiple tool head is shown with four driven members, obviously by changing the size and proportion of the respective parts this number can be varied.

Secured to the quill 21 at its lower end is the indexing collar 37 which has upon it the indexing lug or stop 38 designed to cooperate with the notches 39 in the indexing plate 36. Within the quill sleeve 33 and surrounding the quill 21 is the indexing locking spring 40 which is normally under some tension to maintain the indexing collar 37 and locking lug 38 in its lowermost position.

The driving spindle 19 terminates in the conventional arbor 41 to which is fitted a driver head 42. This driver head contains a number of novel features which render it particularly suitable for the purposes of this multiple tool head. The driver head is constructed of the hollow driver sleeve 43 which terminates at its inner lower surfaces in the inclined driver clutch face 44. Within the driver sleeve is the driver dog 45 surrounded by the driver clutch spring 46 and terminating in the driver dog teeth 47. The driver dog has formed upon it the driver locking plate 48 and the driver sleeve at its upper end is formed into the driver sleeve assembly plate 49. As will be hereinafter set forth, these respective plates and their formation are important for the purposes of assembly of the driver head 42.

Each of the driven members mounted upon the multiple head housing 31 comprises the chuck mounting housing 51, the chuck bearings 52, the chuck shaft 53, and the chuck driving teeth 54 which project within the housing for engagement with the driver dog teeth 47.

The outer surfaces 55 of the chuck driving teeth 54 are cut at an angle corresponding with the inclined face of the driver clutch face 44.

Method of assembly

In order to mount the multiple driver head of this invention upon a radial drill press of conventional type it is first necessary to assemble the driver head 42 shown in Fig. 5. As is shown best in Fig. 4, the driver sleeve is capped by a driver sleeve assembly plate 49 which is cut with a rectangular cut. Similarly, the driver dog 45 has, near its upper end, a driver locking plate 48 which is cut into rectangular configuration. After the driver clutch spring 46 is inserted in the driver sleeve 43, the driver dog 45 can be inserted into the driver sleeve 43 with the long dimension of the driver locking plate 48 passing through the longer dimension of the driver sleeve assembly plate 49. After the driver locking plate 48 has cleared the driver sleeve assembly plate 49 the driver dog 45 is turned one-quarter of a revolution and the long dimension of the driver locking plate 48 then protrudes beyond the opening in the driver sleeve assembly plate 49 so that the driver dog cannot be retracted from the driver sleeve 43 without reversing the operation just described.

The driver dog is bored with a conventional taper on its inner surface by means of which it can be secured to the tapered spindle 19, as shown in Fig. 2.

With the driver head 42 applied to the spindle 19, the multiple head housing cover 32 is applied to the quill 21 and temporarily secured thereto by means of the screws 34. Before the housing cover 32 with its sleeve 33 are brought into position over the quill 21, the quill must be lowered by means of the spindle feed wheel 23 and there temporarily locked by means of the set screw 34 in sufficiently low position so that the indexing locking spring 40 may be placed in position without being compressed. Also, at this stage and before the housing cover 32 is slipped over the quill 21 the housing ring 35 by means of which the housing cover 32 is to be secured to the housing 31, must be placed into position around the housing cover. The indexing locking spring 40 is placed in position embracing the quill 21 and the indexing collar 37 is then locked to the quill 21 at its lower end. Care must be taken to insure that the locking lug 38 is in the correct position so that when the multiple head housing is finally secured in position one of the driven members will be in alignment with the driving spindle and the driver head 42 secured thereto. When the indexing collar 37 has been properly located and tightened to the quill 21, the set screws 34 can be released. The multiple head housing, with its complement of driven heads mounted thereon, is then brought into position beneath the housing cover 32 and the housing ring bolted thereto to secure the cover 32 to the housing 31.

Method of operation

With the multiple tool head assembled, the structure will appear as shown in Fig. 2. By reversing the movement of the spindle feed wheel 23, the quill is moved upwardly as shown in Fig. 3 and the indexing locking spring 40 compressed between the locking collar 37 and the upper abutment of the housing cover sleeve 33. Thereupon the indexing lug or stop 38 is lifted clear of the indexing plate 36 as shown in Fig. 3.

Thereupon the housing 31 may be rotated about the housing cover 32 and the desired chuck brought into driving position beneath the spindle 19. The housing ring 31 may be engraved with suitable registration marks in order to indicate the position at which the various chucks are in position to be driven. Until one of the chucks is brought into alignment with the spindle 19, the locking lug 38 will be held in its upper position, as shown in Fig. 3, by means of the indexing plate 36. The locking lug can return to the lower position only when one of the notches 39 is brought into registry with the locking lug 38 and this can occur only when one of the chuck shafts 53 is in proper driving alignment with the spindle 19.

Obviously, as long as the locking lug 38 is held in its upper position, shown in Fig. 3, by means of the indexing plate 36, the quill 21 will also be held in its upper position and the driver head 42 cannot be brought into driving relation with the driven dog 54.

As soon as one of the notches 39 in the indexing plate 36 is brought into correct position, the locking lug 38 can be lowered into the position shown in Fig. 2 by the advancing of the hand wheel 23. With the locking lug 38 embraced by the walls of one of the notches 39 the housing 31 is securely locked against rotation.

As the feed wheel 23 is advanced, the driver head 42 is lowered. The driver clutch spring 46 advances the driver sleeve 43 ahead of the driver dog 45 so that the inclined faces 44 of the driver dog come into contact with the inclined surfaces 55 of the driven dog 54. If this is done while the spindle is rotating, this frictional engagement of the complementary surfaces of the driver sleeve 43 and the driven dog 54 will impart rotation to the driven shaft 53 so that as the dog teeth 47 in the driver descend to engage the dog teeth 54 on the driven member, the engagement will be readily effected without any clashing of the teeth.

The tension of the indexing locking spring 40 is much greater than that of the driver clutch spring 46 so that as the locking spring 40 continues to force the indexing collar downward with the downward movement of the quill, the driver clutch spring 46 will be compressed and with the inclined surfaces 44 and 55 remaining in engagement, the driver teeth 47 and the driven teeth 54 can be deeply enmeshed.

Further movement of the hand wheel lowers the entire quill housing chuck and all other parts in the conventional manner of radial drill operation, the feed wheel being thus used both to bring the spindle into engagement with the driven member and to feed the tool into the work on the work table.

When one of the tools has been used and it is desired to change to another, the operation just described is reversed. The hand wheel is turned backward to lift the tool clear of the work and when the housing cover 32, with its attached sleeve 33, reaches the uppermost position in contact with the spindle head 20, further movement of the hand wheel compresses the indexing locking spring 40, lifts the locking lug 38 clear of the indexing plate notch 39, simultaneously disengaging the driving head 42 from the driven member.

An important feature of this invention is the fact that all of the operation hereinabove described can be conducted and the tools changed and brought into and out of service merely by manipulation of the feed wheel while the drill press, motor and spindle continue operating. The construction of this multiple tool head, nevertheless, is such that the housing is positively locked against any rotation while the driver and driven members are in or near driving engagement, and driving engagement cannot be restored until the housing is moved into a position where the parts are exactly registered to permit the driver to come into proper driving engagement with the driven dog. These features of the invention permit the tool to be used without interrupting the operation of the driving motor and without any danger to the respective parts of the machine.

Having thus shown and described one embodiment of the invention, it is to be understood that it is capable of many modifications. Changes, therefore, in the construction and arrangement may be made without departing from the spirit and scope of the invention as disclosed in the appended claims, in which it is intended to claim all novelty inherent in the invention as broadly as permissible, in view of the prior art.

We claim:

1. A multiple tool head for a drill press having a spindle quill and a driving spindle comprising, an indexing lug carried by the quill and axially movable with the quill, a housing rotatable relatively to the quill, a plurality of driven members carried by the housing to be selectively aligned with the spindle upon rotation of the housing, and an indexing plate in the housing having a plurality of notches for selectively registering with the indexing lug when the driven members are selectively aligned with the spindle, said indexing lug overlying the indexing plate when the quill is axially retracted to permit rotation of the housing and normally prevent axial advance of the quill, said notches in said indexing plate receiving the indexing lug only when the selected driven member is in alignment with the spindle to permit the quill to be axially advanced for engaging the spindle with the selected driven member.

2. A multiple tool head for a drill press having a spindle quill and a driving spindle comprising, a housing carried by the quill and rotatable relative to the quill and axially movable with the quill, an indexing lug carried by the quill and axially movable with the quill, said housing and indexing lug being axially movable with respect to each other between locking and unlocking positions, a locking spring for urging the housing and indexing lug in locking position, a plurality of driven members carried by the housing to be selectively aligned with the spindle upon rotation of the housing, and an indexing plate in the housing having a plurality of notches for selectively registering with the indexing lug when the driven members are selectively aligned with the spindle, said indexing lug overlying the indexing plate in unlocked position when the quill is axially retracted to permit rotation of the housing and normally prevent axial advance of the quill, said notches in said indexing plate receiving the indexing lug in locked position only when the selected driven member is in alignment with the spindle to permit the quill to be axially advanced for engaging the spindle with the selected driven member.

CHARLES S. BOHMER.
CARL A. GRUNSCHEL.

REFERENCES CITED

The following references are of record in the file of this patent:

UNITED STATES PATENTS

| Number | Name | Date |
|---|---|---|
| 776,404 | Keyser | Nov. 29, 1904 |
| 790,484 | Denyes | May 23, 1905 |
| 1,320,152 | Klay | Oct. 28, 1919 |
| 1,924,383 | Stampfli | Aug. 29, 1933 |